United States Patent [19]

Zschau

[11] Patent Number: 4,771,354

[45] Date of Patent: Sep. 13, 1988

[54] WRITE-PROTECT CLIP

[75] Inventor: Leo F. Zschau, Marlborough, Mass.

[73] Assignee: Lotus Development Corporation, Cambridge, Mass.

[21] Appl. No.: 865,478

[22] Filed: May 21, 1986

[51] Int. Cl.⁴ ..................... G11B 23/033; G11B 19/04
[52] U.S. Cl. ....................................... 360/133; 360/60
[58] Field of Search ........................ 360/60, 132, 133; 206/444

[56] References Cited

U.S. PATENT DOCUMENTS 3,828,363  8/1974  Somers ................................. 360/60
4,084,200  4/1978  Adair et al. ......................... 360/133
4,618,060 10/1986  Tarter .................................. 206/444
4,620,247 10/1986  Papciak et al. .................. 360/133 X
4,649,452  3/1987  Brugman ............................. 360/133

OTHER PUBLICATIONS

Lee, "Reusable Write Protect Tab for a Diskette", IBM Tech. Disc. Bull., vol. 26, No. 8, Jan. 1984.
Gilligan, "Reusable Write Protect Tab for Floppy Disk", IBM Tech. Disc. Bull., vol. 26, No. 12, May 1984.

Primary Examiner—Stuart N. Hecker
Assistant Examiner—Benjamin E. Urcia
Attorney, Agent, or Firm—Spencer & Frank

[57] ABSTRACT

A write-protect clip can be permanently installed on a floppy disc and thereafter can be moved to an opened position which exposes the write-protect notch of the floppy disc or to a closed position which covers the notch. The clip, which is a unitary element made from a sheet of metal, includes first and second walls which slidably engage the outer surface of the envelope of the floppy disc, a back wall which connects the first and second walls, and a serpentine spring tongue which extends between the first and second walls and which is joined to one of the walls at a sharply bent region. When the clip is installed on a floppy disc, the tongue enters the envelope via the notch to prevent the clip from being inadvertently detached from the floppy disc and to enhance frictional engagement between the clip and the envelope, thereby helping to retain the clip in either the opened or the closed position. Moreover, the sharply bent region is positioned to engage the ends of the notch so that the clip cannot be inadvertently moved beyond the opened position or the closed position.

8 Claims, 3 Drawing Sheets

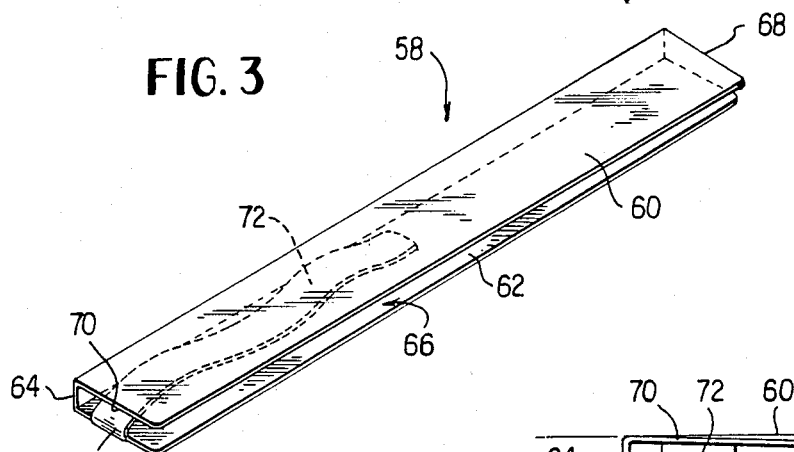
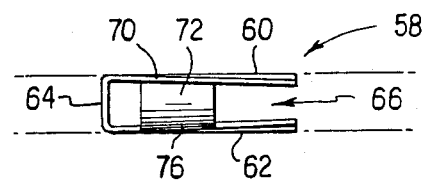
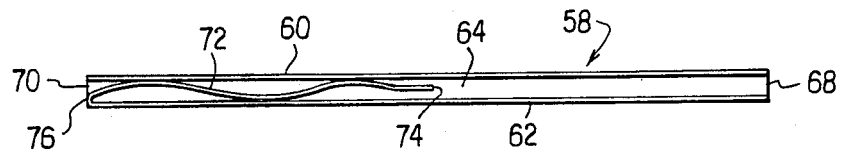
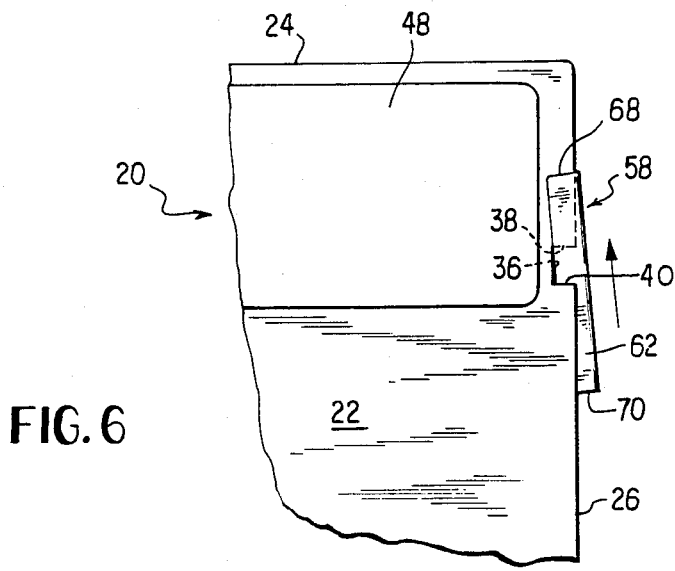

WRITE-PROTECT CLIP

BACKGROUND OF THE INVENTION

The present invention is directed to a write-protect clip for a floppy disc, and more particularly to a clip which can be permanently attached to a floppy disc and which can thereafter be removed to a position which exposes the floppy disc's write-protect notch or to a position which closes the notch.

A magnetic medium housed in a protective cover is commonly employed to store data and programs for personal computers. The magnetic medium, such as iron oxide, is deposited on both sides of a flexible, disc-shaped plastic sheet. Because of this the entire assembly is referred to as a "floppy disc" (although other designations such as "discette" or simply "disc" may also be used), even though the protective cover is usually square. The floppy disc is used by inserting it into a disc drive provided by the computer; the disc drive spins the plastic sheet bearing the magnetic medium and moves one or more magnetic read/write heads against the medium to record information on the medium or to receive previously recorded information from the medium. A disc drive is designed to cooperate with floppy discs having a particular size and protective cover configuration.

FIGS. 1 and 2 illustrate a floppy disc 20 which is widely used with personal computers, including the International Business Machines "PC" personal computer. The protective cover of floppy disc 20 is provided by a flexible plastic envelope 22 having four edges 24, 26, 28, and 30, a top side 32, and a bottom side 34. Edge 26 is provided with a rectangular write-protect notch 36 having ends 38 and 40. As will be seen from FIG. 2, the various edges are formed by border portions 42 which extend from top side 32 and which are folded around to bottom side 34, where the border portions 42 are bonded with bottom side 34 to seal envelope 22.

With continuing reference to FIGS. 1 and 2, floppy disc 20 also includes a circular plastic sheet 44 having magnetic medium deposited on its top and bottom sides. Sheet 44 is rotatable within envelope 22. Porous paper leaves 46 are adhesively attached to the inner walls of top side 32 and bottom side 34 and are impregnated with a lubricant to minimize friction with sheet 44 and to remove debris from the surface of sheet 44.

An adhesive paper label 48 is commonly applied to envelope 22 adjacent edge 24 to identify the contents of the disc. Sheet 44 has a central opening 50 which is bordered by an engagement region 52. Region 52 is engaged by the disc drive (not illustrated), through openings 54 in envelope 22, to spin sheet 44. Envelope 22 is also provided with elongated openings 56 which permit the magnetic heads (not illustrated) of the disc drive to move to various radial positions while in contact with sheet 44.

During use, edge 28 of floppy disc 20 is inserted into a slot (not illustrated) in the disc drive (not illustrated) and is locked into place by operating a lever (not illustrated) or similar mechanism. A sensor (not illustrated) within the disc drive is positioned to detect write-protect notch 36. The sensor may be mechanical, such as a microswitch, or electrical, such as an LED-/photodiode combination. If notch 36 is open, as illustrated in FIG. 1, the operating system of the computer permits information to be both read from and recorded onto floppy disc 20. In some situations, however, it is desirable to protect floppy disc 20 from inadvertent changes or erasures. In such a situation one can write-protect the floppy disc 20 before inserting it into the drive by applying an adhesive strip (not illustrated) which covers notch 36. In such a situation notch 36 would not be detected by the sensor within the disc drive, whereupon the operating system would permit information to be read from floppy disc 20 but would prohibit changes from being made. That is, the floppy disc 20 would be write-protected.

The use of adhesive strips for write-protection has several disadvantages. Although floppy discs are typically sold with a supply of adhesive strips made specifically for write-protection, the user may have misplaced the strips when the need for them arises. This might tempt the user to try a substitute, with undesirable consequences if the substitute proves ineffective. Even if the user is careful to use only strips that are specifically intended for write-protection, the adhesive may eventually deteriorate due to the passage of time and the generation of heat within the disc drive. A detached strip could destroy both the disc drive and the floppy disc.

SUMMARY OF THE INVENTION

An object of the invention is to provide write-protection for a floppy disc without the use of an adhesive strip.

Another object of the invention is to provide a write-protect clip which can be permanently attached to a floppy disc, with the clip being selectively movable to one position to close the write-protect notch and to another position to open it.

Another object of the present invention is to provide a write-protect clip which a user can permanently mount on a floppy disc without modifying the floppy disc itself, and which the user can subsequently remove without damaging the floppy disc.

Another object of the present invention is to provide a write-protect clip with a tongue which enters the envelope of the floppy disc to secure the clip to the floppy disc and to help retain the clip in the desired position.

These and other objects are obtained by providing a write-protect clip having a top wall to engage the top side of the floppy disc, a bottom wall to engage the bottom side of the floppy disc, and a tongue which extends between the walls to enter the envelope of the floppy disc at the write-protect notch.

BRIEF DESCRIPTION OF THE DRAWINGS

FIG. 3 is a perspective view of the write-protect clip of the present invention;

FIG. 4 is a side view of the clip;

FIG. 5 is a end view of the clip;

FIG. 6 is a top plan view, partially broken away, illustrating a stage in the installation of the clip onto a floppy disc;

DESCRIPTION OF THE PREFERRED EMBODIMENTS

Figure 1:
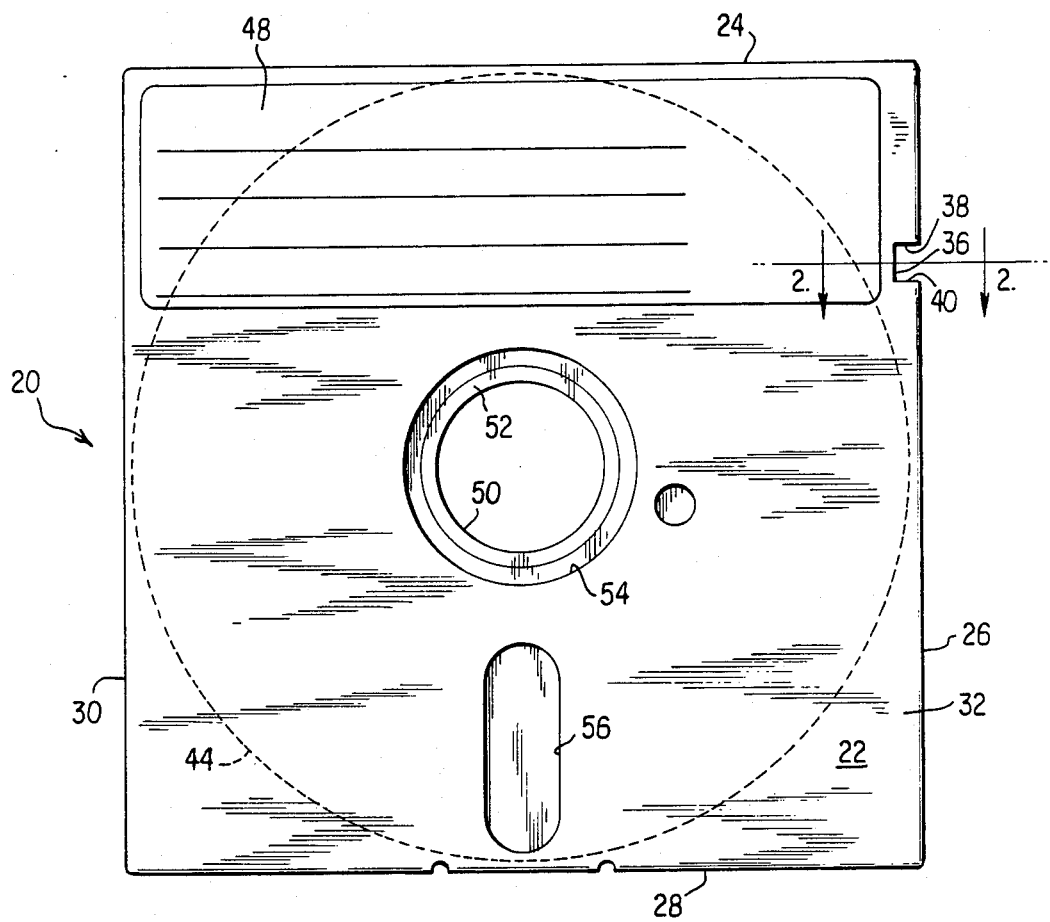
FIG. 1 is a top plan view of a typical floppy disc.

With reference to FIGS. 3-5, write-protect clip 58 of the present invention includes a wall 60 and a wall 62 which are joined by a back wall 64. Opposite wall 64 is an open slot region 66 between walls 60 and 62. When clip 58 is installed on a floppy disc 20, as will be discussed, end 68 is directed toward edge 24 (see FIG. 1) and end 70 is directed toward edge 28 (FIG. 1). A spring tongue 72 which is integral with wall 62 extends between walls 60 and 62.

It will be seen from FIG. 4 that tongue 72 is serpentine in configuration and loops back and forth between walls 60 and 62, touching one wall and then the other, and that its free end 74 is positioned mid-way between walls 60 and 62. Opposite end 74, tongue 72 is joined to wall 62 at a connection region 76 that is sharply bent.

Walls 60, 62 and 64 are generally U-shaped in longitudinal cross section, with slot region 66 being at the mouth of the "U," but it will be seen from FIG. 5 that walls 60 and 62 are pinched inward by a degree or so at end 70. This pinch, which is illustrated only in FIG. 5 and which is exaggerated for purposes of illustration in that Figure, provides clip 58 with a slightly narrowed profile at end 70. It has been found that a narrowed profile at end 70 is needed to ensure reliable operation with certain disc drives that use a microswitch to detect the write-protect notch.

Walls 60 and 62 are preferably 1.375 inches long and 0.218 inches wide. Except at end 70 they are generally parallel and are preferably spaced apart by 0.06 inches. Tongue 72 is preferably 0.03 inches wide. Clip 58 is preferably made by stamping a workpiece from a sheet of beryllium-copper 0.008 inches thick. It will be apparent that, after stamping, the workpiece has a rectangular portion which will be bent to provide walls 60-64 and, extending from the rectangular portion, a strip which will form tongue 72. The beryllium-copper alloy used is number 172, a standard assigned by the Copper Development Association. After the workpiece is bent into the configuration of clip 58 it is heat treated by heating it at 700° F. for 20 minutes to Rockwell 15N 76 minimum in molten salt. Thereafter, the workpiece is bright-plated with nickel to form clip 58.

Figure 2:
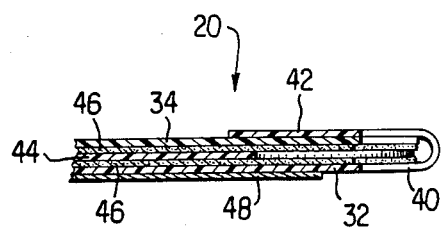
FIG. 2 is a sectional view taken along the line 2—2 of FIG. 1.
Figure 7:
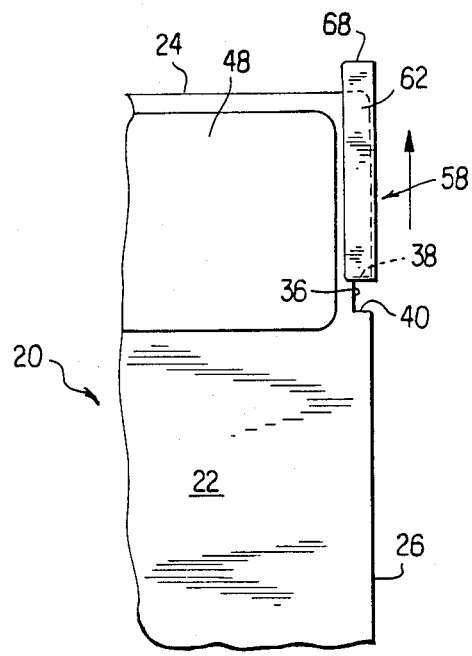
FIG. 7 is a top plan view, partially broken away, illustrating the write-protect clip in its open position to expose the write-protect notch of a floppy disc.
Figure 8:
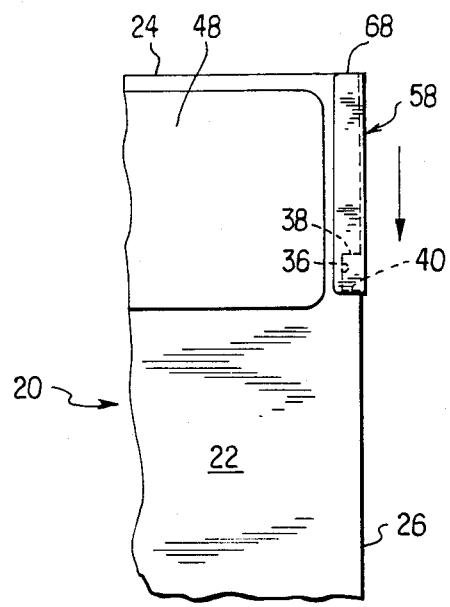
FIG. 8 is a top plan view, partially broken away, illustrating the write-protect clip in its closed position.

The procedure for installing clip 58 on a floppy disc 20 will now be described with reference to FIGS. 3 and 6. In FIG. 6 the user has placed clip 58 into notch 36 in such a manner that envelope 22 enters slot region 66 above notch end 38 but not below notch end 40. That is, above notch end 38 the walls 60 and 62 lie on either side of envelope 22, with back wall 64 touching edge 26, and below notch end 40 both walls 60 and 62 lie beneath envelope 22. End 74 of tongue 72 is then positioned to slide between sides 32 and 34 (FIG. 2) and thereby enter envelope 22 when the user slides clip 58 in the direction of the arrow in FIG. 6. This leads to the installed position illustrated in FIG. 7 (which shows clip 58 in the open position, in which floppy disc 20 is not write-protected). Clip 58 can thereafter be moved to the closed position, as illustrated in FIG. 8, so that floppy disc 20 will be write-protected. In FIG. 8, clip 58 cannot be moved further downward because connection region 76 abuts end 40 of notch 36; in FIG. 7, clip 58 cannot be moved further upward because connection region 76 abuts end 38 of notch 36; and in both FIGS. 7 and 8 clip 58 cannot be moved outward from edge 26 because tongue 72 lies within envelope 22.

When clip 58 is installed on floppy disc 20 it will be apparent that the inner surface of wall 62 frictionally engages the outer surface of top side 32 and that the inner surface of wall 60 frictionally engages the outer surface of bottom side 34. Moreover, the undulations of tongue 72 bias side 32 toward wall 62 and side 34 toward wall 60. That is, tongue 72 pinches envelope 22 against clip 58 to enhance the frictional engagement so that clip 58 cannot be accidentally dislodged from the open position of FIG. 7 or the closed position of FIG. 8.

Although clip 58 cannot be accidentally detached after installation in the manner discussed above, it can be intentionally removed from floppy disc 20. To do this, when clip 58 is in its open position (FIG. 7) floppy disc 20 is bent along a line which is parallel to edge 24 and which runs through notch 36, thereby shifting notch end 40 out of alignment with connection region 76 (FIG. 3) so that clip 58 can be slid away from notch 36.

From the foregoing discussion it will be apparent that the present invention provides a write-protect clip which can be permanently installed on a floppy disc so that it cannot be accidentally detached, and which can be moved to an opened position if the user of the floppy disc does not desire write-protection or to a closed position if write-protection is desired.

It will be understood that the above description of the present invention is susceptible to various modifications, changes, and adaptations, and the same are intended to be comprehended within the meaning and range of equivalence of the appended claims.

What I claim is:

1. A write-protect clip for installation on a floppy disc having an envelope with top and bottom sides that are joined at an edge having a write-protect notch therein, said clip comprising:
   a first wall to slidably engage the outer surface of the top side of the envelope when the clip is manually moved while installed on the floppy disc;
   a second wall to slidably engage the outer surface of the bottom side of the envelope when the clip is manually moved while installed on the floppy disc, the second wall being spaced apart from the first wall;
   a back wall joining the first and second walls; and
   a tongue to enter the enevelope at the notch when the clip is installed on the floppy disc, the tongue being affixed to one of the walls and extending between the first and second walls,
   wherein the installed clip is slidable, in a direction parallel to the edge of the envelope, between an open position wherein the write-protect notch is exposed and a closed position wherein the write-protect notch is covered by the first and second walls.

2. The clip of claim 1, wherein the first wall, second wall, back wall, and tongue are provided by a unitary piece of beryllium-copper sheet metal.

3. The clip of claim 1, wherein the clip is elongated and has first and second ends, the first wall, second wall, and back wall extending from the first end to the second end, and wherein the tongue is attached to the first end of one of the first and second walls and extends between the first and second walls toward the second end of the clip.

4. The clip of claim 3, wherein the tongue terminates before reaching the second end of the clip.

5. The clip of claim 4, wherein the tongue terminates substantially midway between the first and second ends of the clip.

6. The clip of claim 1, wherein the tongue is springy and undulates, moving first toward one of said first and second walls and then toward the other of said first and second walls.

7. The clip of claim 1, wherein the tongue terminates at a position spaced apart from both the first and second walls.

8. The clip of claim 1, wherein the first and second walls are generally parallel but are pinched toward each other at the first end of the clip.

* * * * *